US010402939B2

(12) United States Patent
Narita et al.

(10) Patent No.: US 10,402,939 B2
(45) Date of Patent: Sep. 3, 2019

(54) INFORMATION PROCESSING DEVICE, INFORMATION PROCESSING METHOD, AND PROGRAM

(71) Applicant: SONY CORPORATION, Tokyo (JP)

(72) Inventors: Tomoya Narita, Kanagawa (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 15/324,462

(22) PCT Filed: May 14, 2015

(86) PCT No.: PCT/JP2015/063921
§ 371 (c)(1),
(2) Date: Jan. 6, 2017

(87) PCT Pub. No.: WO2016/027527
PCT Pub. Date: Feb. 25, 2016

(65) Prior Publication Data
US 2017/0193633 A1    Jul. 6, 2017

(30) Foreign Application Priority Data

Aug. 20, 2014   (JP) ................. 2014-167425

(51) Int. Cl.
*G09G 5/00* (2006.01)
*G06T 3/20* (2006.01)
(Continued)

(52) U.S. Cl.
CPC .............. *G06T 3/20* (2013.01); *G06F 1/163* (2013.01); *G06F 1/1652* (2013.01); *G06F 3/048* (2013.01); *G09G 5/00* (2013.01); *G06T 2200/24* (2013.01)

(58) Field of Classification Search
CPC ............. G06F 3/04845; G06F 3/04812; G06F 3/0486; G06T 1/60; G06T 3/40
(Continued)

(56) References Cited

U.S. PATENT DOCUMENTS

2007/0160140 A1*  7/2007  Fujisawa ............. H04N 19/159
                                                                  375/240.12
2010/0149073 A1*  6/2010  Chaum ............... G02B 27/0093
                                                                  345/8
(Continued)

FOREIGN PATENT DOCUMENTS

JP    2002-006797    1/2002
JP    2007-225629    9/2007
(Continued)

Primary Examiner — Gordon G Liu
(74) Attorney, Agent, or Firm — Paratus Law Group, PLLC

(57) ABSTRACT

There is provided an information processing device to improve visibility of an image displayed in a display area in which a plurality of normal directions are present of a curved display or the like, the information processing device including: a display controller that controls a way of displaying an object image corresponding to an image of an object displayed in a display area in which a plurality of normal directions are present. The display controller controls the way of displaying the object image such that a first display area included in the display area and a second display area included in the display area and different from the first display area have different ways of displaying.

21 Claims, 5 Drawing Sheets

(51) Int. Cl.
*G06F 3/048* (2013.01)
*G06F 1/16* (2006.01)

(58) Field of Classification Search
USPC .......................................................... 345/676
See application file for complete search history.

(56) References Cited

U.S. PATENT DOCUMENTS

| | | | | |
|---|---|---|---|---|
| 2014/0118319 A1* | 5/2014 | Jeon | ........................ | G06F 1/00 |
| | | | | 345/207 |
| 2015/0185874 A1* | 7/2015 | Raffa | ................... | G06F 3/0346 |
| | | | | 345/158 |
| 2015/0227245 A1* | 8/2015 | Inagaki | ................ | G06F 3/0412 |
| | | | | 345/173 |

FOREIGN PATENT DOCUMENTS

| | | |
|---|---|---|
| JP | 2013-191210 | 9/2013 |
| WO | WO2012/085981 A1 | 6/2012 |
| WO | WO2013/132885 A1 | 9/2013 |

* cited by examiner

FIG. 5

A → ABCDEFGHIJKLMNOPQRSTUVW
abcdefghijklmnopqrstuvwxyz012
ABCDEFGHIJKLMNOPQRSTUVW B → BCDEFGHIJKLMNOPQRSTUV
bcdefghijklmnopqrstuvwxyz01
BCDEFGHIJKLMNOPQRSTUV C → ABCDEFGHIJKLMNOPQRSTU
abcdefghijklmnopqrstuvwxyz0
ABCDEFGHIJKLMNOPQRSTU

FIG. 6

A → ABCDEFGHIJKLMNOPQRSTU
abcdefghijklmnopqrstuvwxyz0
ABCDEFGHIJKLMNOPQRSTU

B → ABCDEFGHIJKLMNOPQRSTU
abcdefghijklmnopqrstuvwxyz0
ABCDEFGHIJKLMNOPQRSTU

C → BCDEFGHIJKLMNOPQRST
cdefghijklmnopqrstuvwxyz
BCDEFGHIJKLMNOPQRST

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2015/063921 (filed on May 14, 2015) under 35 U.S.C. § 371, which claims priority to Japanese Patent Application No. 2014-167425 (filed on Aug. 20, 2014), which are all hereby incorporated by reference in their entirety.

TECHNICAL FIELD

The present disclosure relates to an information processing device, an information processing method, and a program.

BACKGROUND ART

A technology for estimating a viewpoint of a user and controlling display contents displayed on a display screen on the basis of the estimated viewpoint has been developed. A technology for controlling display contents displayed on a display screen on the basis of a viewpoint estimated based on sensor information (data) acquired from a sensor, for example, may be the technology described in Patent Literature 1.

CITATION LIST

Patent Literature

Patent Literature 1 WO 2013/132885

DISCLOSURE OF INVENTION

Technical Problem

Devices capable of displaying various images (still images and moving images) in a display area in which a plurality of normal directions are present, for example, devices including a curved display, have appeared. When an image is displayed in a display area in which a plurality of normal directions are present as described above, for example, color reproducibility and visibility may be deteriorated.

The present disclosure proposes a novel and improved information processing device, information processing method and program which may enhance the visibility of an image displayed in a display area in which a plurality of normal directions are present.

Solution to Problem

According to the present disclosure, there is provided an information processing device including: a display controller that controls a way of displaying an object image corresponding to an image of an object displayed in a display area in which a plurality of normal directions are present. The display controller controls the way of displaying the object image such that a first display area included in the display area and a second display area included in the display area and different from the first display area have different ways of displaying.

According to the present disclosure, there is provided an information processing method that is executed by an information processing device, the information processing method including: a step of controlling a way of displaying an object image corresponding to an image of an object displayed in a display area in which a plurality of normal directions are present. In the controlling step, the way of displaying the object image is controlled such that a first display area included in the display area and a second display area included in the display area and different from the first display area have different ways of displaying.

According to the present disclosure, there is provided a program for causing a computer to execute: a step of controlling a way of displaying an object image corresponding to an image of an object displayed in a display area in which a plurality of normal directions are present. In the controlling step, the way of displaying the object image is controlled such that a first display area included in the display area and a second display area included in the display area and different from the first display area have different ways of displaying.

Advantageous Effects of Invention

According to the present disclosure, the visibility of an image displayed in a display area in which a plurality of normal directions are present can be improved.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is an explanatory diagram of an example of processing of the information processing method according to the present embodiment.

FIG. 6 is an explanatory diagram of an example of processing of the information processing method according to the present embodiment.

MODE(S) FOR CARRYING OUT THE INVENTION

Figure 1:
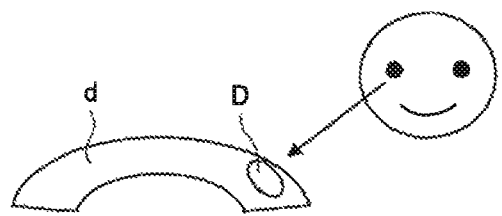
FIG. 1 is an explanatory diagram of a first example of a viewpoint acquisition process according to the present embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Hereinbelow, a description will be given in the following order.

1. Information processing method according to present embodiment
2. Information processing device according to present embodiment
3. Program according to present embodiment (Information Processing Method According to Present Embodiment)

Prior to description of a configuration of an information processing device according to the present embodiment, an information processing method according to the present embodiment will be described first. In the following, a case in which the information processing device according to the present embodiment performs processing of the information processing method according to the present embodiment will be exemplified to describe the information processing method according to the present embodiment.

[1] Overview of Information Processing Method According to Present Embodiment

As described above, when an image is displayed in a display area in which a plurality of normal directions are present, for example, color reproducibility and visibility may be deteriorated.

Here, a display area in which a plurality of normal directions are present according to the present embodiment, for example, may be an area in which an image may be displayed in a display screen of a curved display, an area in which an image may be displayed when a display screen of a pseudo curved display is composed of a plurality of flat panel displays, or the like. Hereinafter, the display area in which a plurality of normal directions are present according to the present embodiment may be simply referred to as "a display area according to the present embodiment". In addition, a user who views an image displayed in the display area according to the present embodiment may be simply referred to as "a user" hereinafter.

As a specific example, color tones seen by the user may be different in a part of the display area according to the present embodiment, right in front of the user, and a part of the display area, which faces a direction different from the user. Accordingly, when an image such as a picture is displayed in the display area according to the present embodiment, color reproducibility of the picture may be deteriorated.

Furthermore, when an image destined to be projected onto a plane having one normal direction is displayed as it is in the display area according to the present embodiment, for example, keystone distortion may be generated. Accordingly, when an image including characters (or text or character string) is displayed in the display area according to the present embodiment, for example, readability of characters of the peripheral part of the display area according to the present embodiment may be deteriorated and visibility may be decreased.

Accordingly, the information processing device according to the present embodiment improves the visibility of an image displayed in the display area according to the present embodiment by reconstructing an image displayed in the display area according to the present embodiment, viewed from a viewpoint of the user, into an intended form.

The information processing device according to the present embodiment controls the way of displaying an image of an object (referred to hereinafter as "an object image") in the display area according to the present embodiment. The information processing device according to the present embodiment controls the way of displaying the object image such that a first display area included in the display area according to the present embodiment and a second display area included in the display area of the present embodiment and different from the first display area have different ways of display.

Here, the first display area according to the present embodiment and the second display area according to the present embodiment may be regions in the display area according to the present embodiment, which are set as a result of controlling the way of displaying the object image by the information processing device according to the present embodiment through a display control process according to the present embodiment which will be described below, for example. An example of a combination of the first display area according to the present embodiment and the second display area according to the present embodiment may be a region including a peripheral part of the display area according to the present embodiment (referred to hereinafter as "a peripheral region") and the remaining region of the display area according to the present embodiment other than the peripheral region (referred to hereinafter as "a central region"), for example.

In addition, examples of the way of displaying the object image such that the first display area and the second display area have different ways of display may be the following examples.

The object image is displayed in the central region (the first display area or an example of the second display area) as it is, and a corrected object image is displayed in the peripheral region (the second display area or an example of the first area).

The tone of the object image displayed in the display area according to the present embodiment changes between the central region (the first display area or an example of the second display area) and the peripheral region (the second display area or an example of the first area).

More specifically, the information processing device according to the present embodiment controls the way of displaying the object image, for example, on the basis of a viewpoint of the user for the display area according to the present embodiment.

Here, the display area according to the present embodiment, in which the information processing device according to the present embodiment displays an image, may be a display area of a display unit (which will be described below) included in the information processing device according to the present embodiment or a display area of an external display device connected to the information processing device according to the present embodiment. The information processing device according to the present embodiment displays an image in the display area according to the present embodiment by delivering a signal representing the image and a control signal for controlling display to the display unit (which will be described below).

In a specific example, the display area according to the present embodiment may be a display area of a wearable device that may be worn on the body of a user, such as an arm or a wrist of the user, for example. The display area according to the present embodiment is not limited to the display area of a wearable device and may be display areas of various devices such as communication devices, such as cellular phones and smartphones, and tablet type devices.

Furthermore, the object image according to the present embodiment may be a moving image or a still image, for example. In addition, the object image according to the present embodiment may be a plurality of overlaid images. When the object image according to the present embodiment is overlaid images, the information processing device according to the present embodiment may perform the same display control or different display controls for respective images of layers of the object image. In addition, when the object image according to the present embodiment is overlaid images, the information processing device according to the present embodiment may partially control display by performing display control for part of the images, for example.

For example, the information processing device according to the present embodiment may use an image, stored in a storage unit (which will be described below) included in the information processing device according to the present embodiment or a storage medium such as an external storage medium connected to the information processing device according to the present embodiment, as the object image. Furthermore, the information processing device according to the present embodiment may use an image, acquired through communication from an external device connected to the information processing device according to the present embodiment wirelessly or in a wired manner, as the object image, for example.

For example, controlling the way of display according to the present embodiment may be "controlling the tone of the object image displayed in the display area according to the present embodiment", "correcting the object image for preventing generation of distortion when the object image is displayed in the display area according to the present embodiment and displaying the corrected object image in the display area according to the present embodiment" or a combination thereof.

Control of the tone of the object image displayed in the display area according to the present embodiment is realized by, for example, "correcting the tone of the object image on the basis of a viewpoint of the user for the display area according to the present embodiment" or "controlling display parameters of a display device (e.g., parameters for adjusting luminance, color temperature, contrast, etc.) relating to the display area according to the present embodiment on the basis of the viewpoint of the user for the display area according to the present embodiment." Here, correction of the tone of the object image may be correction of one or more of the luminance or contrast, color and saturation, for example.

As described above, the tone of the object image displayed in the display area according to the present embodiment can be adjusted by controlling the tone of the object image displayed in the display area according to the present embodiment. Accordingly, deterioration of color reproducibility can be prevented by controlling the tone of the object image displayed in the display area according to the present embodiment.

Furthermore, correction of the object image to prevent generation of distortion according to the present embodiment may be correction of keystone distortion, for example.

As described above, correction of distortion is performed and thus the corrected object image is displayed in the display area according to the present embodiment, thereby preventing generation of keystone distortion when the object image is displayed in the display area according to the present embodiment. Accordingly, deterioration of visibility can be prevented by performing distortion correction and displaying the corrected object image in the display area according to the present embodiment.

As described above, for example, the information processing device according to the present embodiment controls the way of displaying the object image in the display area according to the present embodiment. Accordingly, the information processing device according to the present embodiment may prevent deterioration of color reproducibility and deterioration of visibility to improve the visibility of an image displayed in the display area in which a plurality of normal directions are present.

The processing of the information processing method according to the present embodiment will be described in more detail.

[2] Processing of Information Processing Method According to Present Embodiment

The information processing device according to the present embodiment controls the way of displaying the object image in the display area according to the present embodiment (display control process). The information processing device according to the present embodiment controls the way of displaying the object image such that a first display area included in the display area according to the present embodiment and a second display area included in the display area of the present embodiment and different from the first display area have different ways of displaying.

More specifically, the information processing device according to the present embodiment controls the way of displaying the object image in the display area according to the present embodiment on the basis of a viewpoint of the user (simply referred to as a "viewpoint" hereinbelow) for the display area according to the present embodiment.

For example, the viewpoint according to the present embodiment may be the position of one eye of the user (e.g., the center position of a predetermined part of an eye such as the pupil or the like) or an intermediate position between the eyes of the user (e.g., the position of the center point between center positions of predetermined parts of the eyes or the like).

In addition, the viewpoint according to the present embodiment is represented, for example, by coordinates in a coordinate system having a reference position corresponding to the display area according to the present embodiment as the origin. For example, the reference position corresponding to the display area according to the present embodiment may be a preset fixed position or a position that may be set on the basis of a user operation or the like.

The viewpoint according to the present embodiment may be acquired through a viewpoint acquisition process according to the present embodiment, for example.

Here, the viewpoint acquisition process according to the present embodiment may be performed as the processing of the information processing method according to the present embodiment in the information processing device according to the present embodiment or may be performed in an external device connected to the information processing device according to the present embodiment wirelessly or in a wired manner.

When the viewpoint acquisition process according to the present embodiment is performed in the information processing device according to the present embodiment, the information processing device according to the present embodiment performs a display control process using viewpoint information (data) indicating a viewpoint acquired by performing the viewpoint acquisition process. In addition, when the viewpoint acquisition process according to the present embodiment is performed in the external device, the information processing device according to the present embodiment performs a display control process using viewpoint information acquired from the external device through communication.

Prior to description of the display control process relating to the information processing method according to the present embodiment, an example of the viewpoint acquisition process according to the present embodiment will be described. A case in which the information processing device according to the present embodiment performs the viewpoint acquisition process according to the present embodiment is illustrated hereinbelow.

For example, the viewpoint acquisition process according to the present embodiment may be processes (A) to (C) below.

(A) First Example of Viewpoint Acquisition Process

FIG. 1 is an explanatory diagram of a first example of the viewpoint acquisition process according to the present embodiment. "d" shown in FIG. 1 denotes an example of the display area according to the present embodiment and D shown in FIG. 1 represents an example of an imaging device capable of imaging in a direction in which an image is displayed in the display area according to the present embodiment. The imaging device generates a moving image or a still image according to imaging. Here, the direction in which an image is displayed in the display area according to the present embodiment is a direction in which the user views an image displayed in the display area according to the present embodiment, for example. Although not illustrated in FIG. 1, there may be a plurality of imaging devices capable of imaging in a direction in which an image is displayed in the display area according to the present embodiment.

When there is imaging in the direction in which an image is displayed in the display area according to the present embodiment by the imaging device D as illustrated in FIG. 1, the information processing device according to the present embodiment estimates a viewpoint on the basis of an image acquired by imaging of the imaging device D (referred to hereinafter as a "captured image").

The information processing device according to the present embodiment detects a user face from the captured image, for example, using any face detection method capable of detecting a face in an image, such as a method of detecting a face by detecting a feature point such as an eye in an image. In addition, the information processing device according to the present embodiment estimates a viewpoint of the user, for example, on the basis of data indicating an imaging range of the imaging device D, the position of an area in which the face is detected in the captured image (referred to hereinafter as a "face area"), the size of the detected face area and the like. That is, a viewpoint acquired through the viewpoint acquisition process according to the first example corresponds to a viewpoint acquired by directly observing the viewpoint of the user through the captured image.

Here, when a plurality of faces are detected in captured images captured by one or more imaging devices capable of imaging in a direction in which an image is displayed in the display area according to the present embodiment, for example, the information processing device according to the present embodiment does not estimate a viewpoint. In this case, the information processing device according to the present embodiment may estimate a viewpoint of a user having the largest face area size or may perform face recognition to estimate a viewpoint of a specific user.

(B) Second Example of Viewpoint Acquisition Process

Figure 2:
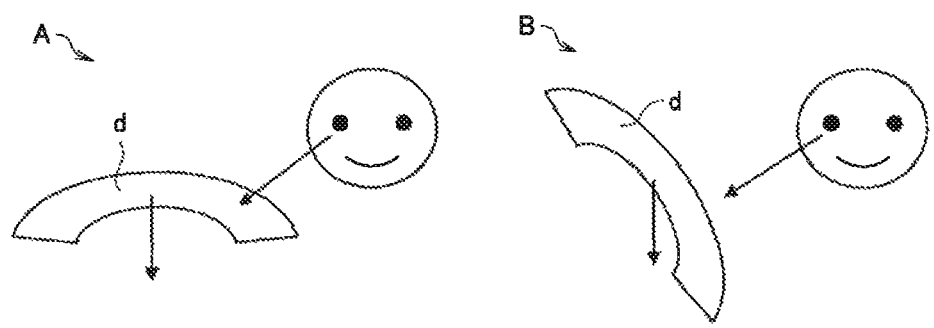
FIG. 2 is an explanatory diagram of a second example of a viewpoint acquisition process according to the present embodiment.

FIG. 2 is an explanatory diagram of a second example of the viewpoint acquisition process according to the present embodiment. "d" shown in FIG. 2 represents an example of the display area according to the present embodiment.

The information processing device according to the present embodiment estimate a viewpoint, for example, on the basis of detection data of a sensor capable of detecting a posture of a display device relating to the display area according to the present embodiment. For example, the sensor according to the present embodiment may be an acceleration sensor, a gyro sensor or the like. Hereinafter, the detection data of the sensor is represented as sensor information.

The information processing device according to the present embodiment determines a gravity direction on the basis of the sensor information and specifies the posture of the display device relating to the display area according to the present embodiment, for example. In addition, the information processing device according to the present embodiment estimates a viewpoint of the user, for example, on the basis of a profile relating to a preset viewpoint of the user (e.g., a profile corresponding to a common use case) and the determined posture of the display device relating to the display area according to the present embodiment. Here, the information processing device according to the present embodiment may estimate the viewpoint of the user using the technology disclosed in Patent Literature 1 filed by the applicant.

(C) Third Example of Viewpoint Acquisition Process

The information processing device according to the present embodiment estimates a viewpoint of the user, for example, on the basis of "sensor information indicating a detection result of a sensor between a display device relating to the display area according to the present embodiment and a device in a direction consistent with the direction of gaze of the user (or a device in a direction approximately consistent with the direction of gaze of the user, the same hereinafter)" or "a captured image captured by an imaging device capable of imaging in a direction consistent with the direction of gaze of the user (or an imaging device capable of imaging in a direction approximately consistent with the direction of gaze of the user, the same hereinafter)." Here, the device in a direction consistent with the direction of gaze of the user according to the present embodiment may be a glasses type wearable device, an ear hook-on type wearable device or the like, for example. In addition, the imaging device capable of imaging in a direction consistent with the direction of gaze of the user may be an imaging device installed in the device in a direction consistent with the direction of gaze of the user according to the present embodiment, such as a glasses type wearable device or an ear hook-on type wearable device, for example.

The information processing device according to the present embodiment estimates a viewpoint of the user by performing, for example, processes (C-1) to (C-4) described below as the viewpoint acquisition process according to the third example.

(C-1)

A single position sensitive detector (PSD) (light detecting sensor) is installed in the display device relating to the display area according to the present embodiment and a single light emitting element such as an infrared light emitting diode (LED) is installed in the device in a direction consistent with the direction of gaze of the user according to the present embodiment. Here, when a detection axis of the PSD is one axis, the PSD is arranged such that the detection axis of the PSD is consistent with a longitudinal direction of the display area according to the present embodiment.

Here, the direction of the light emitting element installed in the device in a direction consistent with the direction of gaze of the user according to the present embodiment for the display area according to the present embodiment may be determined by sensor information of the PSD. In addition, the direction of the light emitting element determined on the basis of the sensor information of the PSD corresponds to a direction in which the user views the display area according to the present embodiment because the light emitting element is installed in the device in a direction consistent with the direction of gaze of the user according to the present embodiment, such as a glasses type wearable device.

Accordingly, the information processing device according to the present embodiment may determine a direction in which the user views the display area according to the present embodiment on the basis of the sensor information of the PSD. Furthermore, the information processing device according to the present embodiment estimates a viewpoint of the user, for example, using information (data) indicating a distance between the display device relating to the display area according to the present embodiment and the device in a direction consistent with the direction of gaze of the user. Here, the distance between the display device relating to the display area according to the present embodiment and the device in a direction consistent with the direction of gaze of the user may be a preset distance or a distance measured through any distance measurement method.

(C-2)

A plurality of ultrasonic transmitters are installed in the display device relating to the display area according to the present embodiment and a single ultrasonic sensor is installed in the device in a direction consistent with the direction of gaze of the user according to the present embodiment. Here, two or more ultrasonic transmitters are installed in a direction perpendicular to the longitudinal direction of the display area according to the present embodiment, for example.

Here, since the ultrasonic sensor is installed in the device in a direction consistent with the direction of gaze of the user according to the present embodiment, such as a glasses type wearable device, a position at which the ultrasonic sensor is installed may be recognized as a position corresponding to a position at which the user views the display area according to the present embodiment. Accordingly, the information processing device according to the present embodiment may estimate a viewpoint of the user on the basis of sensor information of the ultrasonic sensor, for example, using a triangulation method.

(C-3)

An acceleration sensor and a barometric sensor are installed in each of the display device relating to the display area according to the present embodiment and the device in a direction consistent with the direction of gaze of the user according to the present embodiment.

The information processing device according to the present embodiment measures angles and heights of both the devices with respect to the direction of gravity by combining sensor information of the sensors corresponding to both the devices and estimates a relative orientation of both the devices from measurement results.

The information processing device according to the present embodiment may determine a direction in which the user views the display area according to the present embodiment by estimating the relative orientation of both the devices. In addition, the information processing device according to the present embodiment estimates a viewpoint of the user, for example, using information indicating the distance between the display device relating to the display area according to the present embodiment and the device in a direction consistent with the direction of gaze of the user.

(C-4)

The information processing device according to the present embodiment estimates a direction in which the user views the display area according to the present embodiment on the basis of a captured image captured by the imaging device capable of imaging in a direction consistent with the direction of gaze of the user. The information processing device according to the present embodiment recognizes the display area according to the present embodiment from the captured image and estimates a direction in which the user views the display area according to the present embodiment on the basis of the recognized display area according to the present embodiment when the display area according to the present embodiment is recognized from the captured image. The information processing device according to the present embodiment estimates a direction in which the user views the display area according to the present embodiment, for example, based on the shape of the display area determined according to the present embodiment.

In addition, the information processing device according to the present embodiment estimates a viewpoint of the user, for example, using information indicating the distance between the display device relating to the display area according to the present embodiment and the imaging device capable of imaging in a direction consistent with the direction of gaze of the user (or the device in a direction consistent with the direction of gaze of the user). Here, the distance indicated by the information indicating the distance may be a distance estimated from the size of the display area according to the present embodiment recognized from the captured image or a preset distance. Furthermore, the distance indicated by the information indicating the distance may be a distance measured through any distance measurement method.

The information processing device according to the present embodiment acquires a viewpoint of the user by performing the viewpoint acquisition process according to the first example shown in (A), the viewpoint acquisition process according to the second example shown in (B) or the viewpoint acquisition process according to the third example shown in (C) and performs the display control process according to the present embodiment using the acquired viewpoint of the user. However, the viewpoint acquisition process according to the present embodiment is not limited to the aforementioned examples and may be any process capable of estimating a viewpoint according to the present embodiment.

The information processing device according to the present embodiment controls the way of displaying the object image in the display area according to the present embodiment on the basis of the viewpoint of the user, acquired through the above-described viewpoint acquisition process, for example.

More specifically, the information processing device according to the present embodiment controls the way of displaying the object image in the display area according to the present embodiment through processes (1-1) to (1-3) described below, for example.

Hereinbelow, processes relating to correction of the object image may be collectively referred to or one or more processes relating to correction of the object image may be referred to as a "correction process." Furthermore, the correction process in the display control process according to the present embodiment includes a process that does not correct the object image.

(1-1) First Example of Display Control Process According to Present Embodiment

The information processing device according to the present embodiment controls the way of displaying the object image on the basis of the viewpoint of the user and the shape of the display area according to the present embodiment.

The information processing device according to the present embodiment controls the tone of the object image displayed in the display area according to the present embodiment on the basis of the viewpoint of the user and the shape of the display area according to the present embodiment, for example, and displays the object image in the display area according to the present embodiment.

Control of the tone of the object image displayed in the display area according to the present embodiment is realized by correcting the tone of the object image or controlling display parameters of the display device relating to the display area according to the present embodiment, for example.

(1-1-1) Example of Controlling Tone by Correcting Tone of Object Image

For example, the information processing device according to the present embodiment corrects the tone of the object image in a way of correction corresponding to the shape of the display area according to the present embodiment on the basis of the viewpoint and the shape of the display area according to the present embodiment.

For example, the information processing device according to the present embodiment calculates a degree of tilt of the display device relating to the display area according to the present embodiment with respect to the viewpoint of the user by checking shape data indicating the shape of the display area according to the present embodiment and the acquired viewpoint of the user.

Here, the shape data according to the present embodiment may be data representing a plurality of positions indicated using the reference position corresponding to the display area according to the present embodiment as a base and data indicating normal directions corresponding to the positions, for example. For example, the shape data according to the present embodiment may be data corresponding to separate regions which will be described below. However, the shape data according to the present embodiment is not limited to the above-described examples and may be any data (or data group) capable of indicating the shape of the display area according to the present embodiment.

In addition, the shape data according to the present embodiment may be data indicating a preset fixed shape or data dynamically varying based on sensor information of an acceleration sensor, gyro sensor or the like.

When the shape data according to the present embodiment is data indicating a preset fixed shape, the information processing device according to the present embodiment uses the shape data stored in a storage unit (which will be described below) or a recording medium such as a connected external recording medium, for example, for the display control process.

Furthermore, when the shape data according to the present embodiment is dynamically varying data, the information processing device according to the present embodiment estimates each position, for example, on the basis of sensor information. In the above case, the information processing device according to the present embodiment specifies a normal direction corresponding to each position, for example, using a table (or a database) in which estimated positions, positions and normal directions are mapped. In addition, the information processing device according to the present embodiment uses shape data including each estimated position and specified each normal direction corresponding to each position for the display control process.

However, a method of acquiring the shape data when the shape data according to the present embodiment is dynamically varying data is not limited to the above-described examples. For example, the information processing device according to the present embodiment may acquire the shape data through any method capable of acquiring the shape data, such as a method of acquiring the shape data on the basis of model data modeling the shape of the display area according to the present embodiment.

Furthermore, when the shape data according to the present embodiment is dynamically varying data, the shape data may be generated in an external device connected to the information processing device according to the present embodiment wirelessly or in a wired manner.

When the "degree of tilt of the display device relating to the display area according to the present embodiment with respect to the viewpoint of the user" is calculated, the information processing device according to the present embodiment corrects the tone of the object image on the basis of the calculated degree of tilt.

Specifically, the information processing device according to the present embodiment specifies a correction process corresponding to the calculated degree of tilt with reference to a table (or a database) in which degrees of tilt are mapped to correction processes for correcting the tone of an image. Then, the information processing device according to the present embodiment corrects the tone of the object image by performing the specified correction process. Here, the correction process for correcting the tone of an image may be a process for correcting one or more of luminance, contrast, color and saturation of an image, for example.

When the information processing device according to the present embodiment performs the process described in (1-1-1), the object image having the corrected tone is displayed in the display area according to the present embodiment and thus the image is displayed in easily visible colors in the display area according to the present embodiment. Accordingly, the information processing device according to the present embodiment can prevent deterioration of color reproducibility.

(1-1-2) Example of Control of Tone Through Control of Display Parameters of Display Device Relating to Display Area According to Present Embodiment The information processing device according to the present embodiment controls display parameters of the display device relating to the display area according to present embodiment on the basis of the calculated "degree of tilt of the display device relating to the display area according to present embodiment with respect to the viewpoint of the user" as in the process described in (1-1-1).

Specifically, the information processing device according to the present embodiment specifies display parameters of the display device relating to the display area according to the present embodiment, which correspond to the calculated degree of tilt, with reference to a table (or a database) in which degrees of tilt are mapped to display parameters of the display device, for example. Then, the information processing device according to the present embodiment controls the display device relating to the display area according to the present embodiment by setting the specified display parameters to the display device relating to the display area according to the present embodiment. The information processing device according to the present embodiment controls the display device relating to the display area according to the present embodiment by delivering a control signal including the display parameters and a display parameter setting command to the display device relating to the display area according to the present embodiment.

When the information processing device according to the present embodiment performs the process described in (1-1-2), the object image is displayed in a tone corresponding to the set display parameters in the display area according to the present embodiment and thus the image is displayed in easily visible colors in the display area according to the present embodiment. Accordingly, the information processing device according to the present embodiment can prevent deterioration of color reproducibility.

(1-1-3)

The information processing device according to the present embodiment may perform a process corresponding to a combination of the process described in (1-1-1) and the process described in (1-1-2).

The information processing device according to the present embodiment controls the tone of the object image displayed in the display area according to the present embodiment by performing one of the processes described in (1-1-1) to (101-3), for example, as the display control process according to the first example.

Meanwhile, the display control process according to the first example is not limited to controlling the tone of the object image displayed in the display area according to the present embodiment on the basis of the viewpoint and the shape of the display area. For example, the information processing device according to the present embodiment may correct the object image for each of the separate regions corresponding to the shape of the display area according to the present embodiment and display the corrected object image in the display area, as illustrated as an example of the display control process according to the second example, which will be described below. That is, the example of the display control process according to the second example, which will be described below, corresponds to an example of the display control process according to the first example.

(1-2) Second Example of Display Control Process According to Present Embodiment

The information processing device according to the present embodiment corrects the object image for each of the separate regions obtained by dividing the display area according to the present embodiment on the basis of the viewpoint of the user and displays the corrected object image in the display area according to the present embodiment.

Here, the separate regions according to the present embodiment may be regions preset for the display area according to the present embodiment such as regions obtained by equally dividing the display area according to the present embodiment into a set number of regions, for example. Furthermore, the regions preset for the display area according to the present embodiment are not limited to regions obtained by equally dividing the display area according to the present embodiment and may be regions having different sizes.

In addition, the separate regions according to the present embodiment may be regions obtained by dividing the display area according to the present embodiment in response to the shape of the display area according to the present embodiment, for example.

For example, the information processing device according to the present embodiment specifies the number of divisions on the basis of shape data acquired through a method of referring to a table (or a database) through which the number of divisions may be specified on the basis of shape data or the like. In addition, the information processing device according to the present embodiment regards regions obtained by equally dividing the display area according to the present embodiment into the specified number of divisions as the separate regions. Furthermore, the separate regions corresponding to the shape of the display area according to the present embodiment are not limited to the above and may be regions set by any method based on the shape of the display area according to the present embodiment.

Specifically, the information processing device according to the present embodiment corrects keystone distortion generated when the user obliquely views the display area according to the present embodiment by performing different coordinate transformations for the separate regions, for example.

Figure 3:
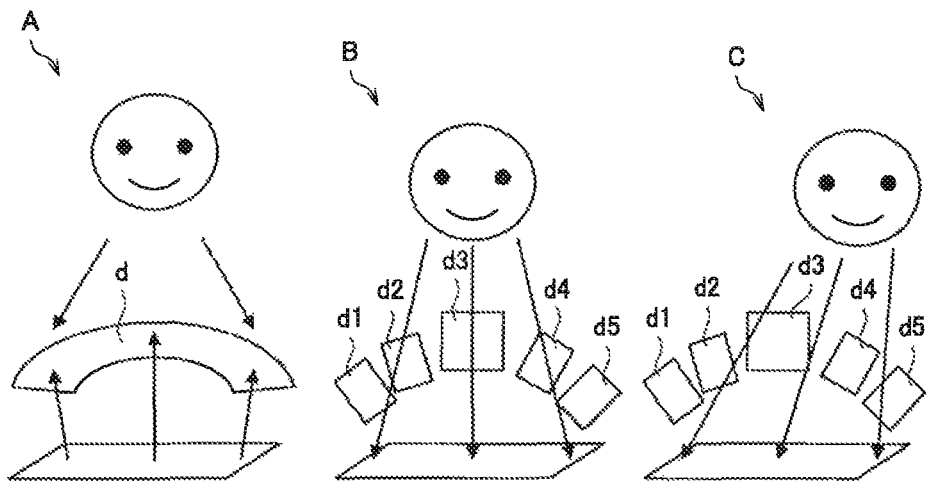
FIG. 3 is an explanatory diagram of an example of a display control process according to an information processing method according to the present embodiment.

FIG. 3 is an explanatory diagram of an example of the display control process relating to the information processing method according to the present embodiment. FIG. 3A illustrates a case in which separate regions are not set, and "d" shown in FIG. 3A represents an example of the display area according to the present embodiment. In addition, FIG. 3B and FIG. 3C illustrate examples in which separate regions obtained by dividing the display area d shown in FIG. 3A are set, and "d1" to "d5" shown in FIG. 3B and FIG. 3C represent examples of the display area according to the present embodiment.

When the object image is simply displayed in the display area according to the present embodiment as illustrated in FIG. 3A, the user may recognize keystone distortion by obliquely viewing the display area according to the present embodiment, for example.

For example, the information processing device according to the present embodiment sets parameters of a virtual 3D rendering imaging device for each separate region in accordance with the curvature of the display area according to the present embodiment. Here, the information processing device according to the present embodiment specifies the curvature of the display area according to the present embodiment, for example, on the basis of data indicating a preset curvature. In addition, the information processing device according to the present embodiment may estimate the curvature of the display area according to the present embodiment on the basis of the shape data.

Furthermore, the information processing device according to the present embodiment creates a state in which the user views an image beyond a display surface of the display device corresponding to the display area according to the present embodiment by adjusting the parameters of the virtual 3D rendering imaging device for each separate region. Then, the information processing device according to the present embodiment connects images processed for the respective separate regions without gaps to obtain the corrected object image with corrected keystone distortion.

At this time, when the object image is a stereoscopic image (an image representing 3D content) having an image for the right eye and an image for the left eye, for example, stereoscopic vision according to motion parallax presentation is realized. Furthermore, the user can sense a feeling of depth in the above case.

The display control process according to the second example will be described in more detail.

Figure 4:
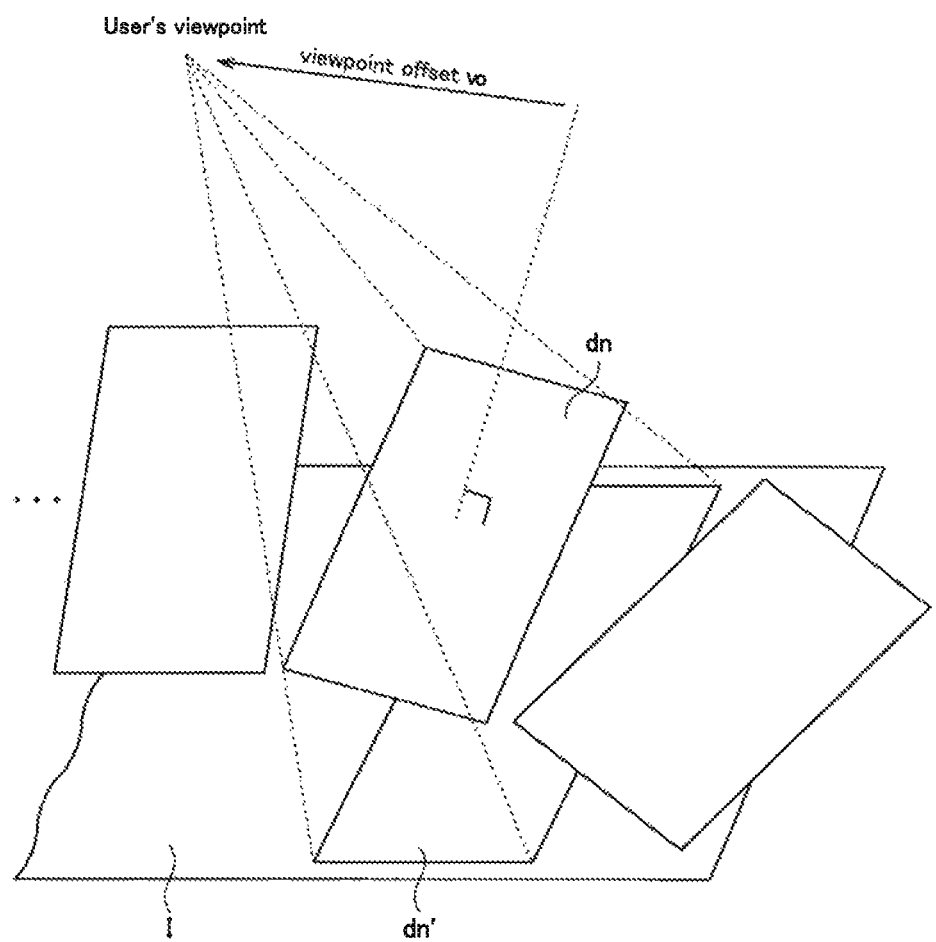
FIG. 4 is an explanatory diagram of an example of a display control process according to an information processing method according to the present embodiment.

FIG. 4 is an explanatory diagram of an example of the display control process relating to the information processing method according to the present embodiment. "dn" (n being a positive integer) shown in FIG. 4 represents an example of a separate region according to the present embodiment, "dn" shown in FIG. 4 is a region in an object image I, which corresponds to the separate region dn.

When a virtual 3D imaging device is arranged in a direction normal to the separate region dn and an image is projected to the display area according to the present embodiment, the position of the virtual imaging device is deviated from the viewpoint of the user ("user's viewpoint" shown in FIG. 4). The information processing device according to the present embodiment performs perspective projection transformation by offsetting the position of the virtual imaging device by an offset vo, for example, such that the user obliquely looks into the inclined separate region dn.

The display control process according to the second example is not limited to the above-described example and the information processing device according to the present embodiment may perform a process according to any method capable of correcting keystone distortion.

FIG. 5 is an explanatory diagram of an example of the processing of the information processing method according to the present embodiment and illustrates an example of an image corrected by the display control process according to the second example.

FIG. 5 illustrates an example of correction of distortion when a display device curved so as to be convex in a longitudinal direction is considered. FIG. 5A illustrates an example of an object image before distortion correction and FIG. 5B and FIG. 5C illustrate examples of distortion-corrected object images. Here, FIG. 5C shows an example of correction around the boundary of the object image.

In the case of the display device curved so as to be convex in the longitudinal direction, the user views peripheral parts in the longitudinal direction in the display area according to the present embodiment (left and right peripheral parts in FIG. 5) more obliquely. Accordingly, the information processing device according to the present embodiment increases a degree of correction for the peripheral parts in the longitudinal direction, for example, as shown in FIG. 5B.

In addition, the boundary line of the image appears near the boundary of the object image as shown in the upper part of the display area according to the present embodiment in FIG. 5C. Although the boundary line of the image is represented as a curved line in FIG. 5C, the boundary line of the image is recognized by the user as a straight line in the display area according to the present embodiment in the display device curved so as to be convex in the longitudinal direction. Accordingly, the boundary line of the image appears as illustrated in FIG. 5C to produce effects of aiding in image space recognition of the user.

When the display control process according to the second example is performed, the information processing device according to the present embodiment does not display content indicated by the original object image in the display area according to the present embodiment dot by dot. Accordingly, a part displayed in a resolution lower than the resolution of the original object image may be generated in some places in the display area according to the present embodiment.

Therefore, the information processing device according to the present embodiment may perform the correction process in response to set display modes such as a display mode of displaying the entire image in the display area according to the present embodiment while sacrificing the resolution, a display mode of displaying the image while maintaining a minimum resolution without accommodating the entire image in the display area according to the present embodiment and a display mode corresponding to an intermediate mode between these display modes. Display modes according to the present embodiment may be fixed display modes preset by application developers or the like or display modes capable of being appropriately set on the basis of a user operation.

FIG. 6 is an explanatory diagram of an example of the processing of the information processing method according to the present embodiment and illustrates other examples of the image corrected through the display control process according to the second example.

FIG. 6 illustrates examples of correction of distortion when a display device curved so as to be convex in a longitudinal direction is considered as in FIG. 5. FIG. 6A illustrates an example of the object image before distortion correction. FIG. 6B illustrates an example of the object image corrected through the display mode of displaying the entire image in the display area according to the present embodiment while sacrificing the resolution. In addition, FIG. 6C illustrates an example of the object image corrected through the display mode of displaying the image while maintaining a minimum resolution without accommodating the entire image in the display area according to the present embodiment.

As shown in FIG. 6B, when correction is performed through the display mode of displaying the entire image in the display area according to the present embodiment while sacrificing the resolution, the corrected object image corresponds to an image with a maintained display view angle and corrected distortion. In addition, as shown in FIG. 6C, when correction is performed through the display mode of displaying the image while maintaining a minimum resolution without accommodating the entire image in the display area according to the present embodiment, the corrected object image corresponds to an image with a maintained display view angle and corrected distortion.

(1-3) Third Example of Display Control Process According to Present Embodiment

The information processing device according to the present embodiment may perform a process corresponding to a selective combination of the process according to the first example described in (1-1) and the process according to the second example described in (1-2).

For example, the combined process may be processes described below. Furthermore, when one or both of the process according to the first example described in (1-1) and the process according to the second example described in (1-2) are performed, contents of executed tone control and correction processes may be varied according to execution conditions which will be described below, for example.

Both the process according to the first example described in (1-1) and the process according to the second example described in (1-2) are performed.

Both the process according to the first example described in (1-1) and the process according to the second example described in (1-2) are not performed.

One of the process according to the first example described in (1-1) and the process according to the second example described in (1-2) is performed.

The combined process is performed to realize, for example, "performing only tone correction for an image corresponding to a picture and performing keystone distortion correction for an image indicating a character string overlaid on the image corresponding to the picture." When the object image is corrected as described above, for example, deterioration of color reproducibility of the picture and deterioration of visibility of the character string are prevented and thus the character string can be read more easily.

The display control process according to the third example will be described in more detail.

(1-3-1) First Example of Process According to Combination

For example, the information processing device according to the present embodiment selectively corrects the object image on the basis of a result of determination of an execution condition with respect to execution of control of the way of display.

For example, execution conditions according to the present embodiment may be conditions described below or a combination of two or more of the conditions described below.

A condition with respect to the shape of the display area according to the present embodiment A condition with respect to processing load A condition with respect to power state (a) When Execution Condition is Condition with Respect to Shape of Display Area According to Present Embodiment The condition with respect to the shape of the display area according to the present embodiment may be a condition for determining whether the shape of the display area according to the present embodiment corresponds to a predetermined shape, for example. For example, when 1, 2 or more from among values indicated by shape data exceeds a set threshold value (or when 1, 2 or more from among the values indicated by shape data is equal to or larger than the set threshold value), the information processing device according to the present embodiment determines that the shape of the display area according to the present embodiment corresponds to a predetermined shape.

The information processing device according to the present embodiment selectively controls the way of displaying the object image on the basis of a result of determination based on the execution condition and the shape of the display area.

As an example, the information processing device according to the present embodiment does not correct the object image when it is determined that the shape of the display area according to the present embodiment corresponds to the predetermined shape. When it is not determined that the shape of the display area according to the present embodiment corresponds to the predetermined shape, the information processing device according to the present embodiment corrects the object image. When the object image is corrected, the information processing device according to the present embodiment corrects the object image through a preset correction process, for example. Furthermore, the information processing device according to the present embodiment may perform a correction process corresponding to shape data by referring to a table, performing threshold processing or the like, for example.

In addition, the information processing device according to the present embodiment displays the selectively corrected object image in the display area according to the present embodiment.

Of course, the process when the execution condition is the condition with respect to the shape of the display area according to the present embodiment is not limited to the above-described example.

(b) When Execution Condition is Condition with Respect to Processing Load

For example, the condition with respect to processing load according to the present embodiment may be a condition relating to determination of a state in which processing load is applied to a processor included in the information processing device according to the present embodiment and actively performing the display control process according to the present embodiment. For example, when a use rate of the processor (an example of a value indicating processing load of the processor) exceeds a set threshold value (or when the use rate of the processor is equal to or greater than the set threshold value), the information processing device according to the present embodiment determines that the processing load is applied to the processor.

The information processing device according to the present embodiment selectively controls the way of displaying the object image on the basis of a result of determination based on the execution condition and processing load.

As an example, the information processing device according to the present embodiment does not correct the object image when it is determined that the processing load is applied to the processor. On the other hand, the information processing device according to the present embodiment corrects the object image when it is determined that the processing load is not applied to the processor. When the object image is corrected, the information processing device according to the present embodiment corrects the object image through a preset correction process, for example. Furthermore, the information processing device according to the present embodiment may perform a correction process corresponding to the use rate of the processor (an example of a value indicating processing load of the processor) by referring to a table, performing threshold processing or the like, for example.

In addition, the information processing device according to the present embodiment displays the selectively corrected object image in the display area according to the present embodiment.

Of course, the process when the execution condition is the condition with respect to processing load is not limited to the above-described example.

(c) When Execution Condition is Condition with Respect to Power State

For example, the condition with respect to a power state according to the present embodiment may be a condition for determining whether a remaining capacity of a predetermined battery providing power is sufficient. When the remaining capacity of the battery exceeds a set threshold value (or the remaining capacity of the battery is equal to or greater than the set threshold value), for example, the information processing device according to the present embodiment determines that the remaining capacity of the predetermined battery is sufficient.

Here, the predetermined battery according to the present embodiment may be a battery capable of providing power to the information processing device according to the present embodiment, such as a battery included in the information processing device according to the present embodiment which performs the display control process according to the present embodiment or an external battery connected to the information processing device according to the present embodiment, for example. The battery according to the present embodiment may be a secondary battery such as a lithium-ion secondary battery or a lithium-ion polymer secondary battery, a primary battery or the like, for example.

The information processing device according to the present embodiment selectively controls the way of displaying the object image on the basis of a result of determination based on the execution condition and the remaining capacity of the predetermined battery.

As an example, the information processing device according to the present embodiment does not correct the object image when it is determined that the remaining capacity of the predetermined battery is not sufficient. On the other hand, the information processing device according to the present embodiment corrects the object image when it is determined that the remaining capacity of the predetermined battery is sufficient. When the object image is corrected, the information processing device according to the present embodiment corrects the object image through a preset correction process, for example. Furthermore, the information processing device according to the present embodiment may perform a correction process corresponding to the remaining capacity of the predetermined battery by referring to a table, performing threshold processing or the like, for example.

In addition, the information processing device according to the present embodiment displays the selectively corrected object image in the display area according to the present embodiment.

Of course, the process when the execution condition is the condition with respect to a power state is not limited to the above-described example.

(1-3-2) Second Example of Process According to Combination

The information processing device according to the present embodiment controls the way of displaying the object image on the basis of the type of the object image. On the basis of a result of determination of the type of the object image, for example, the information processing device according to the present embodiment displays the object image in the display area according to the present embodiment according to a way of displaying the object corresponding to the result of determination.

Here, the information processing device according to the present embodiment determines the type of the object image by analyzing the object image to acquire a result of determination of the type of the object image, for example. Otherwise, the information processing device according to the present embodiment may acquire a result of determination of the type of the object image, for example, by referring to metadata of the object image or by obtaining a result of determination of the type of the object image from an external device connected to the information processing device according to the present embodiment wirelessly or in a wired manner.

As an example, the information processing device according to the present embodiment performs a process relating to character recognition such as optical character recognition (OCR) for the object image. Then, the information processing device according to the present embodiment determines that the object image is an image indicating a character string, for example, when a region in which characters are recognized in the object image is greater than a predetermined size (or when the recognized region is equal to or greater than the predetermined size). In addition, the information processing device according to the present embodiment does not determine that the object image is an image indicating a character string, for example, when the region in which characters are recognized in the object image is equal to or smaller than the predetermined size (or when the recognized region is smaller than the predetermined size).

The information processing device according to the present embodiment determines a correction process corresponding to the result of determination with reference to a table (or a database) in which object image types (e.g., images that indicate character strings and images that do not indicate character strings) are mapped to correction processes. Then, the information processing device according to the present embodiment corrects the object image through the determined correction process and displays the corrected object image in the display area according to the present embodiment.

Of course, the process according to combinations with the second example is not limited to the above-described example.

(1-3-3) Third Example of Process According to Combination

The information processing device according to the present embodiment controls the way of displaying the object image on the basis of an executed application.

As an example, the information processing device according to the present embodiment determines a correction process corresponding to an executed application (or an application that is being already executed) such as an application relating to image processing or an application relating to image display with reference to a table (or a database) in which applications are mapped to correction processes. Then, the information processing device according to the present embodiment corrects the object image through the determined correction process and displays the corrected object image in the display area according to the present embodiment.

Of course, the process according to combinations with the third example is not limited to the above-described example.

(1-3-4) Fourth Example of Process According to Combination

The information processing device according to the present embodiment controls the way of displaying the object image on the basis of setting based on a user operation.

When the process according to combinations with the fourth example is performed, the information processing device according to the present embodiment may display the object image in the display area according to the present embodiment according to a way of display that the user desires on the basis of a user operation performed through an operation unit (which will be described below) included in the information processing device according to the present embodiment, an external device such as a remote controller or the like.

(1-3-5) Fifth Example of Process According to Combination

The information processing device according to the present embodiment may combine two or more processes that may be combined from among the process according to combinations with the first example described in (1-3-1) to the process according to combinations with the fourth example described in (1-3-4).

The information processing device according to the present embodiment performs the aforementioned display control process according to the present embodiment as the information processing method according to the present embodiment. Here, the information processing device according to the present embodiment controls the way of displaying the object image in the display area according to the present embodiment by performing, for example, any one of the process according to the first example described in (1-1) to the process according to the third example described in (1-3) in the display control process according to the present embodiment.

Accordingly, since the display control process according to the present embodiment is performed as the information processing method according to the present embodiment to prevent deterioration of color reproducibility and deterioration of visibility, the information processing device according to the present embodiment can improve visibility of an image displayed in a display area in which a plurality of normal directions are present.

Meanwhile, the processing of the information processing method according to the present embodiment performed by the information processing device according to the present embodiment is not limited to the above-described display control process.

As described, the information processing device according to the present embodiment may further perform the viewpoint acquisition process as the processing of the information processing method according to the present embodiment.

In addition, the information processing device according to the present embodiment may further perform a process of controlling turning ON and OFF a display function of the display device relating to the display area according to the present embodiment (display function control process), for example.

When the display function control process according to the present embodiment is performed, for example, the information processing device according to the present embodiment manages the state of the display function of the display device relating to the display area according to the present embodiment through a table or the like. Furthermore, when the display function control process according to the present embodiment is performed, the information processing device according to the present embodiment may not manage the state of the display function of the display device relating to the display area according to the present embodiment.

For example, the information processing device according to the present embodiment which performs the display function control process according to the present embodiment determines a direction in which the user views the display area according to the present embodiment as in the viewpoint acquisition process according to the third example described in (C). When a direction in which the user views the display area according to the present embodiment is determined, for example, the information processing device according to the present embodiment determines that the user views the display area according to the present embodiment. When a direction in which the user views the display area according to the present embodiment is not determined, the information processing device according to the present embodiment does not determine that the user views the display area according to the present embodiment. Furthermore, the information processing device according to the present embodiment may detect the direction of gaze of the user to the display area according to the present embodiment and determine that the user views the display area according to the present embodiment when the detected direction of gaze of the user is consistent with one of a plurality of normal directions in the display area according to the present embodiment, for example.

When it is determined that the user views the display area according to the present embodiment while the display function of the display device relating to the display area according to the present embodiment is an OFF state, for example, the information processing device according to the present embodiment switches the display function of the display device to an ON state by delivering a control signal for switching the display function to the ON state to the display device relating to the display area according to the present embodiment, in addition, when the display function of the display device relating to the display area according to the present embodiment is switched to the ON state, the information processing device according to the present embodiment may calibrate the reference position corresponding to the display area according to the present embodiment.

Furthermore, when it is determined that the user views the display area according to the present embodiment while the display function of the display device relating to the display area according to the present embodiment is the ON state, for example, the information processing device according to the present embodiment does not deliver the control signal for switching the display function to the ON state to the display device relating to the display area according to the present embodiment. In addition, when it is determined that the user views the display area according to the present embodiment, the information processing device according to the present embodiment may deliver the control signal for switching the display function to the ON state to the display device relating to the display area according to the present embodiment irrespective of the state of the display function of the display device relating to the display area according to the present embodiment.

When it is not determined that the user views the display area according to the present embodiment, for example, the information processing device according to the present embodiment does not deliver the control signal for switching the display function to the ON state to the display device relating to the display area according to the present embodiment. Furthermore, when a state in which it is not determined that the user views the display area according to the present embodiment continues for a predetermined time, the information processing device according to the present embodiment may deliver a control signal for switching the display function to the OFF state to the display device relating to the display area according to the present embodiment.

The information processing device according to the present embodiment may automatically switch the display function of the display device relating to the display area according to the present embodiment to the ON state or OFF state by performing the aforementioned display function control process. Accordingly, the information processing device according to the present embodiment can reduce power consumption for display of the display device relating to the display area according to the present embodiment by performing the above-described display function control process.

(I) "The display control process," (II) "the viewpoint acquisition process and the display control process," (III) "the viewpoint acquisition process and the display function control process," and (IV) "the viewpoint acquisition process, the display control process and the display function control process" are divisions of the processing of the information processing method according to the present embodiment for convenience. Accordingly, the processing of the information processing method according to the present embodiment may recognize the processes shown in each of (II) to (IV), for example, as a single process. In addition, the processing of the information processing method according to the present embodiment may recognize the processes shown in each of (I) to (IV) as two or more processes (according to any division method). Hereinbelow, a case in which the information processing device according to the present embodiment performs the viewpoint acquisition process and the display control process as the processing of the information processing method according to the present embodiment will be mainly illustrated. Meanwhile, the viewpoint acquisition process may be performed in a device external to the information processing device according to the present embodiment.

Figure 7:
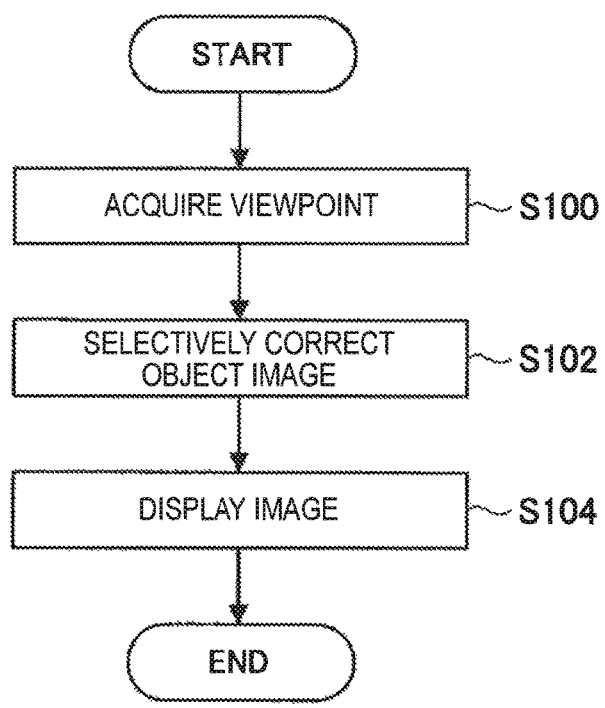
FIG. 7 is a flowchart illustrating an example of processing of the information processing method according to the present embodiment.

[3] Specific Example of Processing of Information Processing Method According to Present Embodiment FIG. 7 is a flowchart illustrating an example of the processing of the information processing method according to the present embodiment. In FIG. 7, a process of step S100 corresponds to the viewpoint acquisition process and processes of steps S102 and S104 correspond to an example of the display control process.

The information processing device according to the present embodiment acquires a viewpoint of the user (S100). For example, the information processing device according to the present embodiment acquires the viewpoint of the user by performing the viewpoint acquisition process according to the first example shown in (A) or the viewpoint acquisition process according to the second example shown in (B).

The information processing device according to the present embodiment selectively corrects the object image (S102). For example, the information processing device according to the present embodiment selectively corrects one or both of the tone of the object image and keystone distortion which may be generated, by performing any one of the process according to the first example shown in (1-1) to the process according to the third example shown in (1-3).

Then, the information processing device according to the present embodiment displays the selectively corrected image in the display area according to the present embodiment (S104).

For example, the processes shown in FIG. 7 are performed to control the way of displaying the object image in the display area according to the present embodiment. Accordingly, the information processing device according to the present embodiment can improve visibility of an image displayed in a display area in which a plurality of normal directions are present by performing the processes shown in FIG. 7, for example.

Of course, the example of the processing of the information processing method according to the present embodiment is not limited to the example shown in FIG. 7.

(Information Processing Device According to Present Embodiment)

Next, an example of a configuration of the information processing device according to the present embodiment which may perform the above-described processing of the information processing method according to the present embodiment will be described. Hereinbelow, a configuration of the information processing device according to the present embodiment when the viewpoint acquisition process and the display control process are performed as the processing of the information processing method according to the present embodiment will be illustrated.

Figure 8:
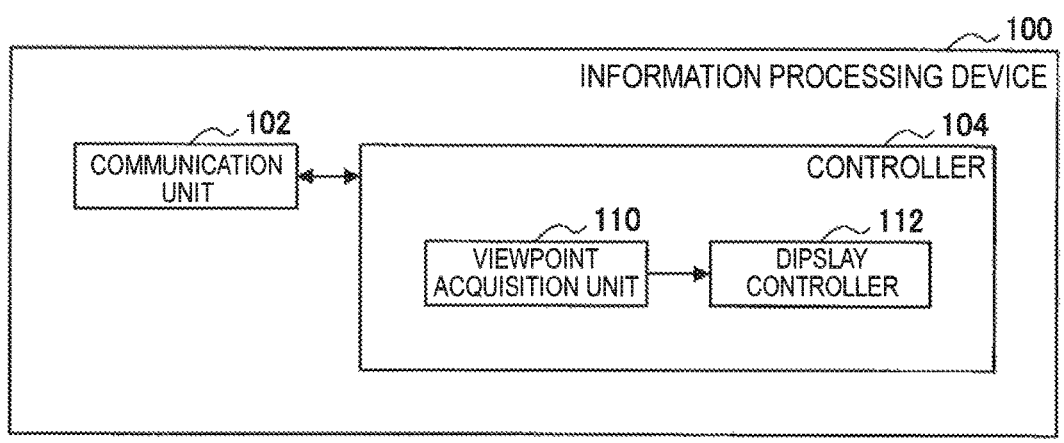
FIG. 8 is a block diagram illustrating an example of a configuration of an information processing device according to the present embodiment.

FIG. 8 is a block diagram illustrating an example of a configuration of the information processing device 100. For example, the information processing device 100 includes a communication unit 102 and a controller 104.

In addition, the information processing device 100 may include a read only memory (ROM) (not shown), a random access memory (RAM) (not shown), a storage unit (not shown), an operation unit (not shown) that may be operated by the user, a display unit (not shown) displaying various screens on a display screen and the like, for example. The information processing device 100 connects the components through a bus as a data transfer path, for example.

The ROM (not shown) stores control data such as programs and arithmetic parameters used by the controller 104. The RAM (not shown) temporarily stores programs and the like executed by the controller 104.

The storage unit (not shown) is a storage means included in the information processing device 100 according to the present embodiment and stores data relating to the display control processing method according to the present embodiment, such as various tables (or databases), image data and various types of data such as various applications or the like, for example. Here, the storage unit (not shown) may be a magnetic recording medium such as a hard disk, a nonvolatile memory such as a flash memory or the like, for example. In addition, the storage unit (not shown) may be attached/detached to/from the information processing device 100.

The operation unit (not shown) may be an operation input device which will be described below, hi addition, the display unit (not shown) may be a display device which will be described below.

[Example of Hardware Configuration of Information Processing Device 100]

Figure 9:
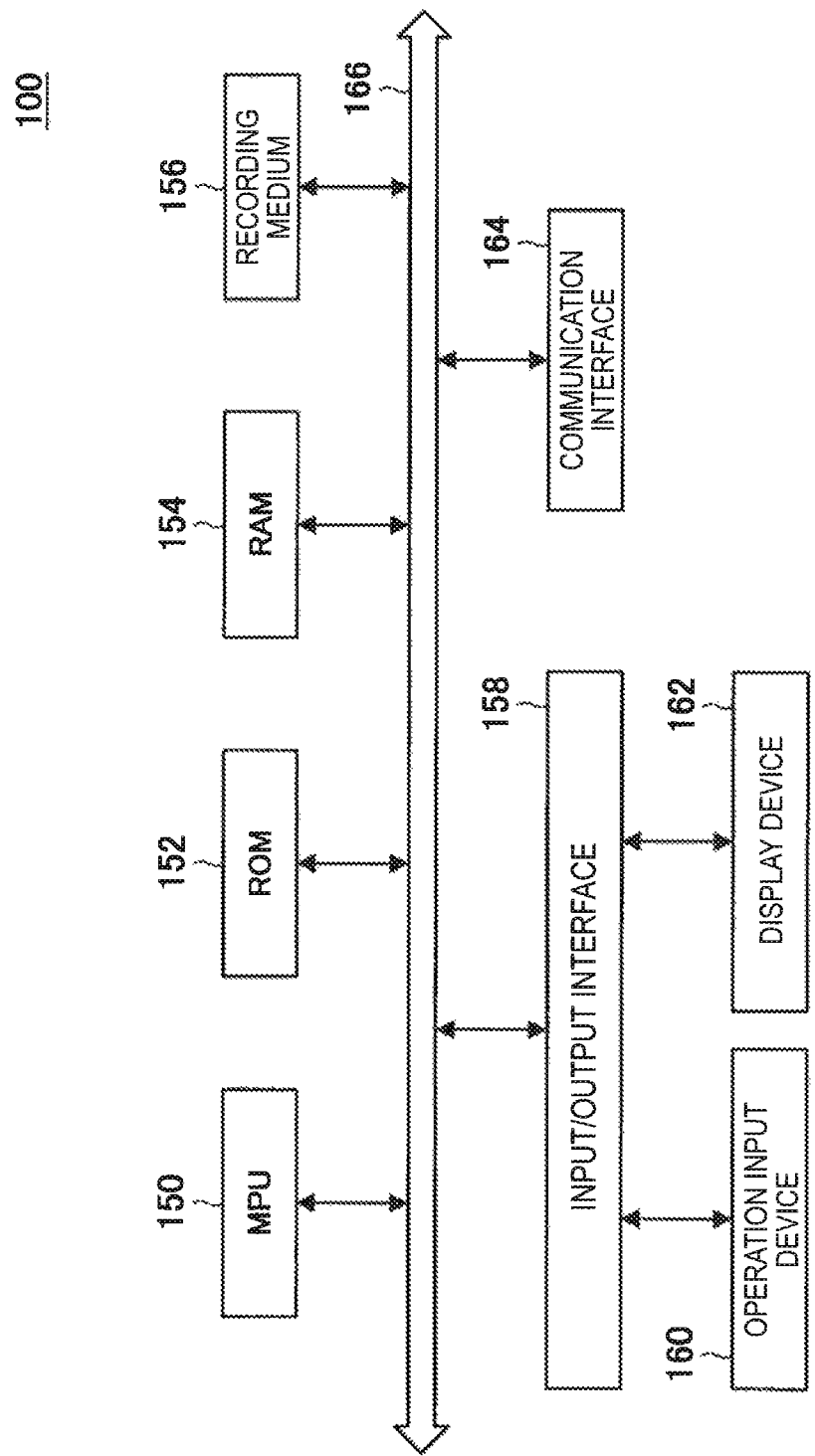
FIG. 9 is an explanatory diagram of an example of a hardware configuration of the information processing device according to the present embodiment.

FIG. 9 is an explanatory diagram of an example of a hardware configuration of the information processing device 100 according to the present embodiment. For example, the information processing device 100 includes an MPU 150, a ROM 152, a RAM 154, a recording medium 156, an input/output interface 158, an operation input device 160, a display device 162 and a communication interface 164. In addition, the information processing device 100 connects the components through a bus 166 as a data transfer path.

For example, the MPU 150 is composed of one or more processors configured as arithmetic circuits such as a micro processing unit (MPU), various processing circuits and the like and functions as the controller 104 that controls the entire information processing device 100. Furthermore, the MPU 150 serves as a viewpoint acquisition unit 110 and a display controller 112 which will be described below, for example, in the information processing device 100.

The ROM 152 stores control data and the like, such as programs and arithmetic parameters used by the MPU 150. The RAM 154 temporarily stores programs and the like executed by the MPU 150, for example.

The recording medium 156 functions as the storage unit (not shown) and stores data relating to the display control processing method according to the present embodiment, such as various tables (or databases), image data and various types of data such as various applications or the like, for example, Here, the recording medium 156 may be a magnetic recording medium such as a hard disk or a nonvolatile memory such as a flash memory, for example. In addition, the recording medium 156 may be attached/detached to/from the information processing device 100.

The input/output interface 158 connects to the operation input device 160 and the display device 162, for example. The operation input device 160 functions as the operation unit (not shown) and the display device 162 functions as the display unit (not shown). Here, the input/output interface 158 may be a universal serial bus (USB) terminal, a digital visual interface (DVI) terminal, a high-definition multimedia interface (HDMI) (registered trademark) terminal, various processing circuits or the like, for example.

In addition, the operation input device 160 is included in the information processing device 100 and connected to the input/output interface 158 inside of the information processing device, for example. The operation input device 160A may be a button, a direction key, a rotary selector such as a jog dial, a combination thereof or the like, for example.

Furthermore, the display device 162 is included in the information processing device 100 and connected to the input/output interface 158 inside of the information processing device 100, for example. The display device 162 is configured as one or more display devices and thus the display area according to the present embodiment is formed by display screens of the display devices. For example, a display device configured as the display device 162 may be a liquid crystal display, an organic electro-luminescence (EL) display, an organic light emitting diode (OLED) display or the like.

Of course, the input/output interface 158 may be connected to an external device such as an external operation input device (e.g., a keyboard, a mouse or the like) as a device external to the information processing device 100 or an external display device. In addition, the display device 162 may be a device enabling display and user operations, for example, a touch panel or the like.

The communication interface 164 is a communication means included in the information processing device 100 and functions as the communication unit 102 for performing wireless or wired communication with external devices such as an external imaging device and an external display device or external apparatuses via a network (or directly). Here, the communication interface 164 may be a communication antenna and radio frequency (RF) circuit (wireless communication), an IEEE 802.15.1 port and transceiver circuit (wireless communication), an IEEE 802.11 port and transceiver circuit (wireless communication), a local area network (LAN) terminal and transceiver circuit (wired communication) or the like, for example. In addition, a network according to the present embodiment may be a wired network such as a LAN or a wide area network (WAN), a wireless network such as a wireless local area network (WLAN), the Internet using a communication protocol such as a transmission control protocol/Internet protocol (TCP/IP), or the like, for example.

For example, the information processing device 100 performs processing relating to the display control processing method according to the present embodiment through the configuration shown in FIG. 9. Meanwhile, the hardware configuration of the information processing device 100 is not limited to the configuration shown in FIG. 9.

For example, the information processing device 100 may not include the communication interface 164 when performing communication with an external apparatus through an external communication device connected thereto or performing standalone processing.

In addition, the information processing device 100 may include an imaging device serving as an imaging unit (not shown) that generates a captured image through imaging, for example. When the imaging device is included, for example, the information processing device 100 may acquire a viewpoint of the user on the basis of the captured image captured by the imaging device.

Furthermore, the information processing device 100 may further include a sensor capable of detecting the posture of the display device relating to the display area according to the present embodiment, such as an acceleration sensor or a gyro sensor, for example. For example, the sensor serves as a detection unit (not shown) for acquiring sensor information in response to a detection result. When the sensor is further included, for example, the information processing device 100 may acquire a viewpoint of the user on the basis of sensor information of the sensor.

Furthermore, the information processing device 100 may have a configuration that does not include the recording medium 156, the operation input device 160 and the display device 162, for example.

For example, the configuration shown in FIG. 9 (or a configuration according to a modification example) may be realized by one or more integrated circuits (ICs).

An example of the configuration of the information processing device 100 will be described with reference to FIG. 8 again. The communication unit 102 is a communication means included in the information processing device 100 and performs wireless or wired communication with external devices such as an external imaging device and an external display device or external apparatuses via a network (or directly). Furthermore, communication of the communication unit 102 is controlled by the controller 104, for example.

Here, the communication unit 102 may be a communication antenna and RF circuit, a LAN terminal and transceiver circuit or the like, for example. However, the configuration of the communication unit 102 is not limited thereto. For example, the communication unit 102 may have a configuration corresponding to any standard enabling communication such as a USB terminal and transceiver circuit or any configuration capable of communicating with an external apparatus via a network. Furthermore, communication of the communication unit 102 is controlled by the controller 104, for example.

The controller 104 is configured as an MPU or the like, for example, to function to control the whole information processing device 100. In addition, the controller 104 includes the viewpoint acquisition unit 110 and the display controller 112, for example, and functions to actively perform processing relating to the display control processing method according to the present embodiment.

The viewpoint acquisition unit 110 functions to actively perform the viewpoint acquisition process to acquire a viewpoint of the user for the display area according to the present embodiment. For example, the viewpoint acquisition unit 110 acquires the viewpoint of the user by performing the viewpoint acquisition process according to the first example shown in (A) or the viewpoint acquisition process according to the second example shown in (B).

The display controller 112 functions to actively perform the display control process to control the way of displaying the object image in the display area according to the present embodiment. For example, the display controller 112 controls the way of displaying the object image in the display area according to the present embodiment on the basis of the viewpoint of the user for the display area according to the present embodiment, such as the viewpoint of the user acquired by the viewpoint acquisition unit 110. More specifically, the display controller 112 performs any one of the process according to the first example shown in (1-1) to the process according to the third example shown in (1-3), for example.

The controller 104 actively performs the processing of the information processing method according to the present embodiment by including the viewpoint acquisition unit 110 and the display controller 112, for example.

For example, the information processing device 100 performs the processing of the information processing method according to the present embodiment (e.g., the viewpoint acquisition process and the display control process) through the configuration shown in FIG. 8.

Accordingly, the information processing device 100 can improve visibility of an image displayed in a display area in which a plurality of normal directions are present through the configuration shown in FIG. 8, for example.

Furthermore, the information processing device 100 can produce the above-described effects obtained by performing the processing of the information processing method according to the present embodiment through the configuration shown in FIG. 8, for example.

The configuration of the information processing device according to the present embodiment is not limited to the configuration illustrated in FIG. 8.

For example, the information processing device according to the present embodiment may include one or both of the viewpoint acquisition unit 110 and the display controller 112 shown in FIG. 8 separately from the controller 104 (e.g., realize as separate processing circuits).

Meanwhile, the viewpoint acquisition process and the display control process are divisions of the processing of the information processing method according to the present embodiment for convenience, as described above. Accordingly, a configuration for realizing the processing of the information processing method according to the present embodiment is not limited to the viewpoint acquisition unit 110 and the display controller 112 shown in FIG. 8 and may be a configuration based on a method of dividing the processing of the information processing method according to the present embodiment.

Furthermore, the information processing device according to the present embodiment may not include the communication unit 102, for example, when the information processing device according to the present embodiment communicates with an external apparatus through an external communication device having the similar function and configuration as the communication unit 102 or performs standalone processing.

In addition, the information processing device according to the present embodiment may have a configuration that does not include the viewpoint acquisition unit 110 shown in FIG. 8. Even when the information processing device according to the present embodiment has a configuration that does not include the viewpoint acquisition unit 110, the information processing device according to the present embodiment can perform the display control process according to the present embodiment so as to improve visibility of an image displayed in a display area in which a plurality of normal directions are present.

Moreover, the information processing device according to the present embodiment may further include a display function controller (not shown) performing the display function control process. For example, the controller 104 serves as the display function controller (not shown) in the information processing device according to the present embodiment. In addition, the display function controller (not shown) may be realized by a processing circuit separate from the controller 104 in the information processing device according to the present embodiment.

Furthermore, the information processing device according to the present embodiment may further include one or both of an imaging unit (not shown) configured as an imaging device to generate a captured image through imaging and a detection unit (not shown) configured as a sensor capable of detecting the posture of the display device relating to the display area according to the present embodiment to obtain sensor information based on a detection result.

While the present embodiment has been described through the information processing device, the present embodiment is not limited thereto. For example, the present embodiment may be applied to various devices, such as a wearable apparatus (wearable device) used by being worn on the body of the user, such as a wrist or an arm of the user, a computer such as a personal computer (PC) or a server, a communication device such as a cellular phone or a smartphone, a tablet type device, an image/music reproduction device (or an image/music recording/reproduction device) and a game machine. In addition, the present embodiment may be applied to a processing IC that may be integrated into the aforementioned devices.

Furthermore, the information processing device according to the present embodiment may be realized by a system composed of a plurality of devices based on connection with a network (or communication between devices) such as cloud computing, for example. That is, the above-described information processing device according to the present embodiment may be realized as a system composed of a plurality of devices, for example.

When the above-described information processing device according to the present embodiment is realized as a system such as a cloud computing system, for example, the system according to the present embodiment performs the processing of the information processing method according to the present embodiment and controls the way of displaying the object image in the display area according to the present embodiment in a device with which the system may communicate wirelessly or in a wired manner (e.g., a device carried by the user or the like). Even when the above-described information processing device according to the present embodiment is not a system composed of a plurality of devices but a single device, the information processing device according to the present embodiment may perform the processing of the information processing method according to the present embodiment and control the way of displaying the object image in the display area according to the present embodiment in a device with which the information processing device may communicate wirelessly or in a wired manner.

(Program According to Present Embodiment)

A program for causing a computer to serve as the information processing device according to the present embodiment (e.g., a program capable of executing the processing of the information processing method according to the present embodiment such as "the display control process" or "the viewpoint acquisition process and the display control process") may be executed by a processor or the like in the computer to improve visibility of an image displayed in a display area in which a plurality of normal directions are present.

Furthermore, a program for causing a computer to serve as the information processing device according to the present embodiment may be executed by a processor or the like in the computer to produce effects obtained by the above-described processing of the information processing method according to the present embodiment.

The preferred embodiments) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above shows that a program (computer program) causing a computer to function as an information processing apparatus according to the present embodiment is provided, but the present embodiment can further provide a recording medium caused to store the program.

The above configuration shows an example of the present embodiment and naturally comes under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
An information processing device including:
a display controller that controls a way of displaying an object image corresponding to an image of an object displayed in a display area in which a plurality of normal directions are present, wherein the display controller controls the way of displaying the object image such that a first display area included in the display area and a second display area included in the display area and different from the first display area have different ways of displaying.

(2)
The information processing device according to (1), wherein the display controller controls the way of displaying the object image on the basis of a viewpoint of a user for the display area.

(3)
The information processing device according to (2), wherein the display area is a display area of a wearable device capable of being worn on the body of the user.

(4)
The information processing device according to (3), wherein the display area is a display area of a wearable device capable of being worn on an arm of the user.

(5)
The information processing device according to (4), wherein the display controller controls the way of displaying the object image on the basis of the viewpoint and the shape of the display area.

(6)
The information processing device according to (5), wherein the display controller controls the tone of the object image and displays the object image in the display area.

(7)
The information processing device according to any one of (4) to (7), wherein the display controller corrects the object image for each of separate regions obtained by dividing the display area on the basis of the viewpoint and displays the corrected object image in the display area.

(8)
The information processing device according to (7), wherein the separate regions are preset regions.

(9)
The information processing device according to (7), wherein the separate regions are regions obtained by dividing the display area in response to the shape of the display area.

(10)
The information processing device according to any one of (1) to (9), wherein the display controller selectively controls the way of displaying the object image on the basis of a result of determination of an execution condition relating to execution of control of the way of display.

(11)
The information processing device according to (10), wherein the execution condition is a condition with respect to the shape of the display area, and the display controller selectively controls the way of displaying the object image on the basis of a result of determination based on the execution condition and the shape of the display area.

(12)
The information processing device according to (10) or (11), wherein the execution condition is a condition with respect to processing load, and the display controller selectively controls the way of displaying the object image on the basis of a result of determination based on the execution condition and the processing load.

(13)
The information processing device according to any one of (1) to (12), wherein the execution condition is a condition with respect to a power state, and the display controller selectively controls the way of displaying the object image on the basis of a result of determination based on the execution condition and a remaining capacity of a predetermined battery that provides power.

(14)
The information processing device according to any one of (1) to (13), wherein the display controller controls the way of displaying the object image on the basis of the type of the object image.

(15)
The information processing device according to any one of (1) to (14), wherein the display controller controls the way of displaying the object image on the basis of an executed application.

(16)
The information processing device according to any one of (1) to (15), wherein the display controller controls the way of displaying the object image on the basis of setting based on a user operation.

(17)
The information processing device according to any one of (2) to (16), further including:
a viewpoint acquisition unit that acquires the viewpoint.

(18)
An information processing method that is executed by an information processing device, the information processing method including:
a step of controlling a way of displaying an object image corresponding to an image of an object displayed in a display area in which a plurality of normal directions are present,
wherein in the controlling step, the way of displaying the object image is controlled such that a first display area included in the display area and a second display area included in the display area and different from the first display area have different ways of displaying.

(19)

A program for causing a computer to execute:

a step of controlling a way of displaying an object image corresponding to an image of an object displayed in a display area in which a plurality of normal directions are present, wherein in the controlling step, the way of displaying the abject image is controlled such that a first display area included in the display area and a second display area included in the display area and different from the first display area have different ways of displaying.

REFERENCE SIGNS LIST 100 information processing device
102 communication unit
104 controller
110 viewpoint acquisition unit
112 display controller

The invention claimed is:

1. An information processing device comprising:
a display controller that controls a display device to display an object image in a display area of the display device in which a plurality of normal directions are present,
wherein the display area has a rectangle curved shape,
wherein the display area includes a center area of the rectangle curved shape and a peripheral area including an entirety of a boundary of the rectangle curved shape,
wherein the display controller controls the display device to display, as the object image, a center object image and a peripheral object image in the center area and the peripheral area, respectively, and
wherein the display controller controls the display device to make a size of the peripheral object image displayed in the peripheral area of the display device larger than a size of the center object image displayed in the center area of the display device.

2. The information processing device according to claim 1, wherein the display controller controls the display device to display the object image on the basis of a viewpoint of a user for the display area.

3. The information processing device according to claim 2, wherein the display device is a wearable device capable of being worn on a body of the user.

4. The information processing device according to claim 3, wherein the display device is a wearable device capable of being worn on a wrist of the user.

5. The information processing device according to claim 4, wherein the display controller corrects the object image for each of separate regions obtained by dividing the display area on the basis of the viewpoint and displays the corrected object image in the display area.

6. The information processing device according to claim 5, wherein the separate regions are preset regions.

7. The information processing device according to claim 5, wherein the separate regions are regions obtained by dividing the display area in response to a shape of the display area.

8. The information processing device according to claim 2, further comprising:
a viewpoint acquisition unit that acquires the viewpoint, wherein the viewpoint acquisition unit is implemented via at least one processor.

9. The information processing device according to claim 2, wherein the display controller calculates a degree of tilt of the display device based on the viewpoint and controls the display device to display the object image on the basis of the degree of tilt.

10. The information processing device according to claim 2, wherein the display controller controls the display device to display the object image on the basis of the viewpoint and a shape of the display area.

11. The information processing device according to claim 1, wherein the display controller controls a tone of the object image and displays the object image in the display area.

12. The information processing device according to claim 1, wherein the display controller selectively controls the display device to display the object image on the basis of a result of determination of an execution condition relating to execution of the control of the display device to display the object image.

13. The information processing device according to claim 12,
wherein the execution condition is a condition with respect to a shape of the display area, and
the display controller selectively controls the display device to display the object image on the basis of a result of determination based on the execution condition and the shape of the display area.

14. The information processing device according to claim 12,
wherein the execution condition is a condition with respect to a processing load, and
the display controller selectively controls the display device to display the object image on the basis of a result of determination based on the execution condition and the processing load.

15. The information processing device according to claim 12,
wherein the execution condition is a condition with respect to a power state, and
the display controller selectively controls the display device to display the object image on the basis of a result of determination based on the execution condition and a remaining capacity of a predetermined battery that provides power.

16. The information processing device according to claim 1, wherein the display controller controls the display device to display the object image on the basis of a type of the object image.

17. The information processing device according to claim 1, wherein the display controller controls the display device to display the object image on the basis of an executed application.

18. The information processing device according to claim 1, wherein the display controller controls the display device to display the object image on the basis of setting based on a user operation.

19. The information processing device according to claim 1, wherein the display controller controls the display device to make a width of the peripheral object image larger than a width of the center object image in a longitudinal direction.

20. An information processing method that is executed by an information processing device, the information processing method comprising:
controlling a display device to display an object image in a display area of the display device in which a plurality of normal directions are present,
wherein the display area has a rectangle curved shape,
wherein the display area includes a center area of the rectangle curved shape and a peripheral area including an entirety of a boundary of the rectangle curved shape, wherein the display device is controlled to display, as the object image, a center object image and a peripheral object image in the center area and the peripheral area, respectively, and wherein the display device is controlled to make a size of the peripheral object image displayed in the peripheral area of the display device larger than a size of the center object image displayed in the center area of the display device.

21. A non-transitory computer-readable medium having embodied thereon a program, which when executed by a computer causes the computer to execute a method, the method comprising:

controlling a display device to display an object image in a display area of the display device in which a plurality of normal directions are present, wherein the display area has a rectangle curved shape, wherein the display area includes a center area of the rectangle curved shape and a peripheral area including an entirety of a boundary of the rectangle curved shape, wherein the display device is controlled to display, as the object image, a center object image and a peripheral object image in the center area and the peripheral area, respectively, and wherein the display device is controlled to make a size of the peripheral object image displayed in the peripheral area of the display device larger than a size of the center object image displayed in the center area of the display device.

* * * * *